US012776461B2

(12) United States Patent
Michalski Laudenslager et al.

(10) Patent No.: US 12,776,461 B2
(45) Date of Patent: Oct. 27, 2026

(54) CONTROL DEVICE

(71) Applicant: Lutron Technology Company LLC, Coopersburg, PA (US)

(72) Inventors: Rebecca Michalski Laudenslager, Hellertown, PA (US); Aaron J. Wilz, Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 254 days.

(21) Appl. No.: 18/641,339

(22) Filed: Apr. 20, 2024

(65) Prior Publication Data

US 2024/0355559 A1 Oct. 24, 2024

Related U.S. Application Data

(60) Provisional application No. 63/460,934, filed on Apr. 21, 2023.

(51) Int. Cl.

| | |
|---|---|
| ***H01H 23/02*** | (2006.01) |
| ***H01H 13/18*** | (2006.01) |
| ***H01H 13/78*** | (2006.01) |

(52) U.S. Cl.

CPC .......... *H01H 23/025* (2013.01); *H01H 13/18* (2013.01); *H01H 13/78* (2013.01); *H01H 2219/014* (2013.01)

(58) Field of Classification Search

CPC .... H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26

See application file for complete search history.

(56) References Cited

U.S. PATENT DOCUMENTS

| | | | |
|---|---|---|---|
| 8,330,638 | B2 | 12/2012 | Altonen et al. |
| 10,109,181 | B2 | 10/2018 | Dimberg et al. |
| 10,181,385 | B2 | 1/2019 | Bhate et al. |
| 10,211,013 | B2 | 2/2019 | Dimberg |

(Continued)

FOREIGN PATENT DOCUMENTS

| | | | |
|---|---|---|---|
| CA | 3181114 | A1 | 4/2022 |
| CA | 3219306 | A1 | 2/2023 |

*Primary Examiner* — Ahmed M Saeed

(74) *Attorney, Agent, or Firm* — Flaster Greenberg P.C.

(57) ABSTRACT

A control device configured for use in a load control system to control one or more electrical loads external to the control device may include a first switch member and a second switch member. The control device may include an actuation member having an upper portion and a lower portion. The actuation member may be configured to actuate the first switch member and the second switch member in response to tactile actuations of the upper portion and the lower portion. The actuation member may include first and second pivot arms that enable the actuation member to pivot about a pivot axis in response to the tactile actuations. The first pivot arm may define a notch. The control device may comprise a light pipe configured to conduct light emitted by a light source through the notch to a light indicator located on the bezel.

59 Claims, 11 Drawing Sheets

(56) References Cited

U.S. PATENT DOCUMENTS

| | | | | |
|---|---|---|---|---|
| 10,849,209 | B2 | 11/2020 | Shivell | |
| 11,069,493 | B2 | 7/2021 | Shivell | |
| 11,237,665 | B2 | 2/2022 | Steiner et al. | |
| 11,569,818 | B2 | 1/2023 | Brogan et al. | |
| 11,636,754 | B2 | 4/2023 | Dimberg | |
| 11,670,468 | B2 | 6/2023 | Blair et al. | |
| 11,817,856 | B2 | 11/2023 | Veskovic | |
| 2011/0147190 | A1 | 6/2011 | Galewyrick et al. | |
| 2011/0259720 | A1* | 10/2011 | Wu | H01H 23/025<br>200/317 |
| 2014/0300275 | A1* | 10/2014 | Altonen | H01H 13/023<br>315/130 |
| 2016/0041569 | A1 | 2/2016 | Kevelos et al. | |
| 2017/0194118 | A1* | 7/2017 | Brudzynsky | H01H 23/025 |
| 2018/0226793 | A1* | 8/2018 | Zhang | H01H 9/168 |
| 2019/0006129 | A1 | 1/2019 | Dimberg et al. | |
| 2023/0036482 | A1* | 2/2023 | Altonen | H05B 47/105 |

* cited by examiner

CONTROL DEVICE

CROSS-REFERENCE TO RELATED APPLICATIONS

This application claims the benefit of Provisional U.S. Patent Application No. 63/460,934, filed Apr. 21, 2023, the entire disclosure of which is hereby incorporated by reference herein in its entirety.

BACKGROUND

During the installation of typical load control systems, standard mechanical switches, such as traditional toggle switches or decorator paddle switches, may be replaced by more advanced load control devices, such as dimmer switches, that control the amount of power delivered from an alternating current (AC) power source to one or more electrical loads. Such an installation procedure typically requires that the existing mechanical switch be disconnected from the electrical wiring and removed from a wallbox in which it is mounted, and that the load control device then be connected to the electrical wiring and installed in the wallbox. An average consumer may not feel comfortable performing the electrical wiring required in such an installation. Accordingly, such a procedure may typically be performed by an electrical contractor or other skilled installer. However, hiring an electrical contractor may be cost prohibitive to the average consumer.

Controllable light sources, such as controllable screw-in light-emitting diode (LED) lamps, may provide an easier solution for providing advanced control of lighting. For example, an older incandescent lamp may simply be unscrewed from a socket and the controllable light source may be screwed into the socket. The controllable light sources may be controlled by remote control devices. However, the sockets in which the controllable light sources are installed may be controlled by an existing wall-mounted light switch. When the wall-mounted light switch is operated to an off position, power to the controllable light source may be cut, such that the controllable light source may no longer respond to commands transmitted by the remote control devices. Accordingly, it is desirable to prevent operation of such a wall-mounted light switch to ensure that the delivery of power to the controllable light source continues uninterrupted.

SUMMARY

As described herein, a control device configured for use in a load control system to control one or more electrical loads external to the control device may comprise a first switch member and a second switch member. The control device may comprise an actuation member comprising an upper portion and a lower portion. The actuation member may be configured to actuate the first switch member in response to a tactile actuation of the upper portion and may be configured to actuate the second switch member in response to a tactile actuation of the lower portion. The actuation member may comprise first and second pivot arms that enable the actuation member to pivot about a pivot axis in response to tactile actuations of the upper portion and the lower portion. The first pivot arm may define a notch. The control device may comprise a bezel configured to at least partially surround the actuation member. The control device may comprise a light source located behind the actuation member. The control device may comprise a light pipe configured to conduct light emitted by the light source to a light indicator located on the bezel. At least a portion of the light pipe may extend through the notch in the first pivot arm. The control device may comprise a control circuit configured to translate input signals provided by the first and second switch members into control data for controlling the electrical load.

The control device may comprise a printed circuit board having the control circuit and the wireless communication circuit mounted thereto, the printed circuit board located between the actuation member and a rear enclosure of the control device. The light pipe may be configured to be attached to the printed circuit board. The light source may be a side-firing light emitting diode (LED). The light pipe may be arranged proximate to a side surface of the light source that emits the light. The control device may comprise a switch membrane that is electrically connected to the printed circuit board. The first and second switch members may be mounted to the switch membrane. The control circuit may be configured to turn the electrical load on in response to actuation of the first switch member and turn the electrical load off in response to actuation of the second switch member. The control device may comprise a light indicator that may be configured to be illuminated by the light source to provide feedback about one or more conditions associated with the electrical load.

The first and second pivot arms may define a hinge that connects the actuation member to the bezel. The first and second pivot arms may define a diamond-shaped cross section with a rounded upper edge, a rounded lower edge, and respective angled upper faces and angled lower faces that meet at respective pivot edges. The angled upper faces and angled lower faces may be configured to abut a rear inner surface of the bezel or a front surface of a printed circuit board of the control device in response to tactile actuation of the upper portion or the lower portion of the actuation member. The bezel may comprise a collar that extends around a perimeter of the bezel. The collar may extend from a rear inner surface of the bezel. The bezel may comprise a pair of stops that extend from each side of the collar. The stops may be configured to engage with the first pivot arm or the second pivot arm to prevent the actuation member from translating up or down with respect to the bezel. The stops and the printed circuit board may be configured to restrict vertical and horizontal movement of the actuation member during tactile actuations of the upper portion and the lower portion.

The control device may comprise a return spring membrane between the actuation member and the first and second switch members. The return spring membrane may be configured to deflect inward to actuate the first switch member in response to tactile actuation of the upper portion and actuate the second switch member in response to tactile actuation of the lower portion. The return spring membrane may comprise a first nub configured to attach the return spring membrane to the upper portion and a second nub configured to attach the return spring membrane to the lower portion. The actuation member may comprise a first socket that extends from a rear surface of the upper portion. The first socket may be configured to captively receive the first nub. The actuation member may comprise a second socket that extends from the rear surface of the lower portion. The second socket may be configured to captively receive the second nub. The first and second nubs may be configured to remain engaged with the respective first and second sockets in response to tactile actuations of the upper portion and the lower portion of the actuation member. The first nub may extend from a first dome portion of the return spring membrane and the second nub may extend from a second dome portion of the return spring membrane. The first and second dome portions may be concave sections of the return spring membrane. The first and second dome portions may comprise tabs that are configured to abut and actuate the respective first and second switch members in response to tactile actuation of the upper portion and lower portion of the actuation member. The first and second dome portions may be configured to flex in response to tactile actuations of the upper portion and the lower portion of the actuation member.

When the upper portion of the actuation member is pressed, the first dome portion may be compressed toward the first switch member and the second dome portion may be pulled away from the second switch member. When the lower portion of the actuation member is pressed, the second dome portion may be compressed toward the second switch member and the first dome portion may be pulled away from the first switch member. The first and second dome portions may be configured to return to an idle state after tactile actuation of the upper portion or the lower portion. The return spring membrane may define wings that extend from each of the first and second dome portions. The wings may be configured to remain engaged with a switch membrane or a printed circuit board of the control device during tactile actuations of the upper portion and the lower portion. Each of the first and second dome portions may define a pair of wings. Each of the pair of wings may be flat against the switch membrane or the printed circuit board when the actuation member is in an idle position and when the corresponding portion of the actuation member is pressed. At least a portion of the pair of wings may remain in contact with the switch membrane or the printed circuit board when the other portion of the actuation member is pressed. The control device may comprise a wireless communication circuit that is configured to transmit messages that include commands for controlling the electrical load based on tactile actuations of the actuation member.

DETAILED DESCRIPTION

Figure 1:
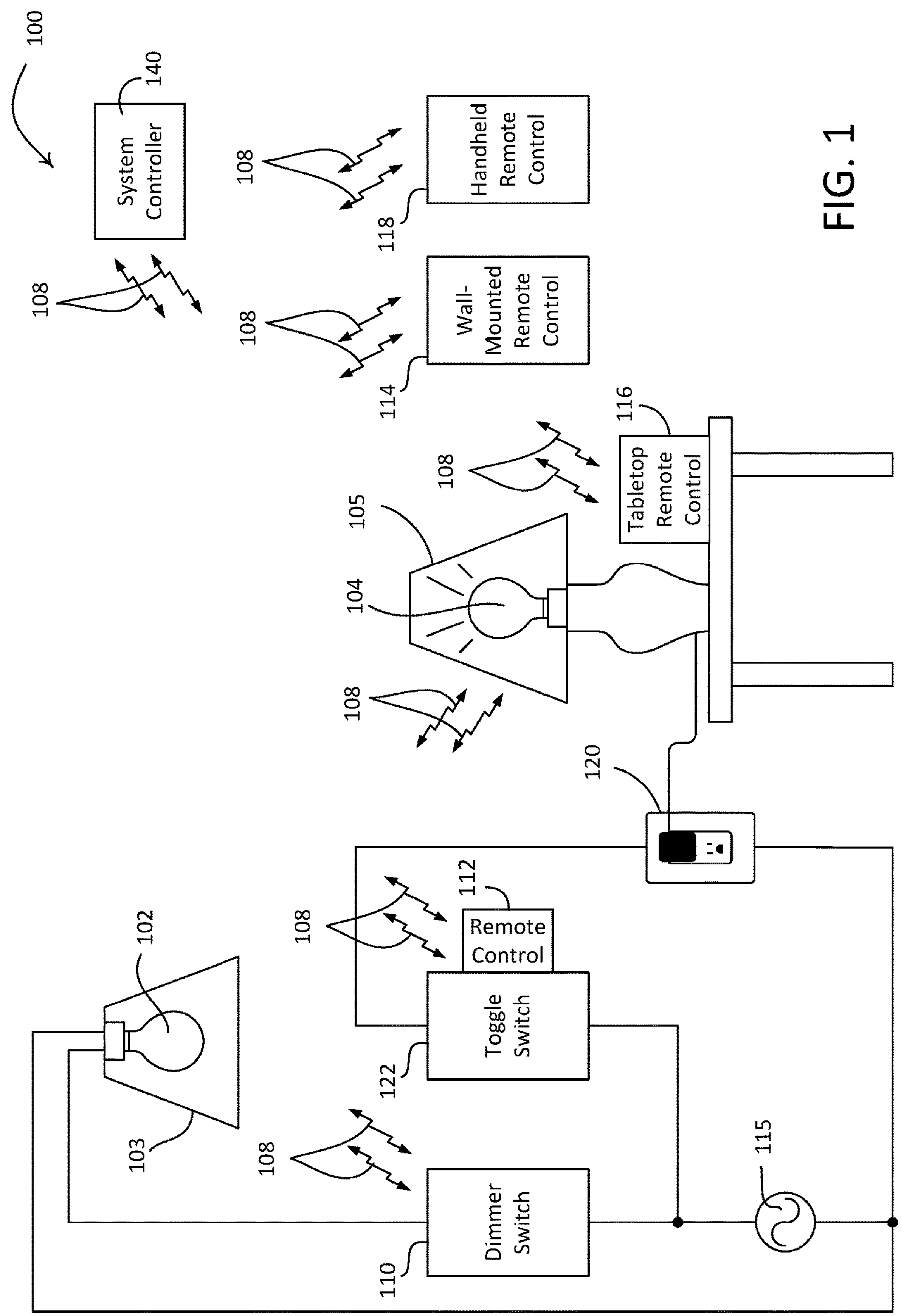
FIG. 1 depicts an example load control system that includes one or more example control devices.

FIG. 1 is a simplified block diagram of an example load control system. As shown, the load control system is configured as a lighting control system 100 for control of one or more lighting loads, such as a lighting load 102 that is installed in a ceiling-mounted downlight fixture 103 and a controllable lighting load 104 that is installed in a table lamp 105. The lighting loads 102, 104 shown in FIG. 1 may include light sources of different types (e.g., incandescent lamps, fluorescent lamps, and/or LED light sources). The lighting loads may have advanced features. For example, the lighting loads may be controlled to emit light of varying intensities and/or colors in response to a user command. The amount of power delivered to the lighting loads may be adjusted to an absolute level or by a relative amount. It should be appreciated that the lighting control system 100 may control other electrical (e.g., non-lighting) loads. The lighting control system 100 may be configured to control one or more of the lighting loads (e.g., and/or other electrical loads) according to one or more configurable presets or scenes. These presets or scenes may correspond to, for example, predefined light intensities and/or colors, predefined entertainment settings such as music selection and/or volume settings, predefined window treatment settings such as positions of shades, predefined environmental settings such as heating, ventilation, and air-conditioning (HVAC) settings, or any combination thereof. The presets or scenes may correspond to one or more specific electrical loads (e.g., bedside lamps, ceiling lights, etc.) and/or one or more specific locations (e.g., a room, an entire house, etc.).

The lighting load 102 may be an example of a lighting load that is wired into a power control and/or delivery path of the lighting control system 100. As such, the lighting load 102 may be controllable by a wall-mounted control device such as a dimmer switch or a toggle switch. The lighting load 104 may be an example of a lighting load that is equipped with integral load control circuitry (e.g., a load control device) and/or wireless communication capabilities such that the lighting load may be controlled via a wireless control mechanism (e.g., by a remote control device).

The lighting control system 100 may include one or more input control devices configured to control load control devices for controlling the lighting loads 102, 104 (e.g., controlling an amount of power delivered to the lighting loads). The lighting loads 102, 104 may be controlled substantially in unison, or be controlled individually. For example, the lighting loads 102, 104 may be zoned so that the lighting load 102 may be controlled by a first input control device, while the lighting load 104 may be controlled by a second input control device. The load control devices may be configured to turn the lighting loads 102, 104 on and off. The load control devices may be configured to control the magnitude of a load current conducted through the lighting loads, e.g., so as to control an intensity level of the lighting loads 102, 104 between a low-end intensity level $L_{LE}$ (e.g., a minimum intensity) and a high-end intensity level $L_{HE}$ (e.g., a maximum intensity). The load control devices may be configured to control an amount of power delivered to the lighting loads to an absolute level (e.g., to a maximum allowable amount), or by a relative amount (e.g., an increase of 10% from a current level). The load control devices may be configured to control a color (e.g., color output) of the lighting load 102, 104 (e.g., by controlling a color temperature of the lighting loads 102, 104 or by applying full color control over the lighting loads 102, 104).

The lighting loads 102, 104 may be smart lamps capable of sending and/or receiving wireless communications. The lighting control system 100 may comprise a load control device 110, which may be an on/off switch and/or a dimmer switch and may include a control circuit. The control circuit may be configured to be responsive to a user input and generate control instructions (e.g., which may be used to generate a phase control signal that may be provided to the lighting load 102) for controlling the lighting load 102 based on the user input. The control instructions may include commands and/or other information (e.g., such as identification information) for controlling the lighting load 102. The load control device 110 may be configured to transmit messages via the RF signals 108 for controlling the lighting loads 102, 104. The load control device 110 may include a wireless communication circuit that is configured to send/receive wireless signals such as the RF signals 108. For example, the load control device 110 may be configured to transmit messages to lighting devices (e.g., the lighting loads 102, 104) that are within a wireless communication range of the load control device 110 via the RF signals 108.

The input control devices may be configured to activate a preset associated with the lighting load 102, 104. A preset may be associated with one or more predetermined settings of the lighting loads, such as an intensity level of the lighting loads and/or a color of the lighting loads. The presets may be configured via the input control device and/or via an external device (e.g., a mobile device) by way of the wireless communication circuit of the input control device. The input control devices may be configured to activate control of a zone. A zone may correspond to one or more electrical loads that are configured to be controlled by the input control devices. A zone may be associated with a specific location (e.g., a living room) or multiple locations (e.g., an entire house with multiple rooms and hallways). The input control devices may be configured to switch between different operational modes. An operational mode may be associated with controlling different types of electrical loads or different operational aspects of one or more electrical loads. Examples of operational modes may include a lighting control mode for controlling one or more lighting loads (e.g., which in turn may include a color control mode and an intensity control mode), an entertainment system control mode (e.g., for controlling music selection and/or the volume of an audio system), an HVAC system control mode, a winter treatment device control mode (e.g., for controlling one or more shades), and/or the like.

One or more characteristics of the input control devices, the load control devices, and/or the lighting loads 102, 104 described herein may be customized via an advanced programming mode (APM). Such characteristics may include, for example, an intensity level associated with a preset, a fade-on/fade-off time, enablement/disablement of visual indicators, a low-end trim (e.g., a minimum intensity level to which the lighting load 102, 104 may be set by the control device), a high-end trim (e.g., a maximum intensity level to which the lighting load 102, 104 may be set by the control device), and/or the like. Examples of an advanced programming mode for a wall-mounted load control device can be found in U.S. Pat. No. 7,190,125, issued Mar. 13, 2007, entitled PROGRAMMABLE WALLBOX DIMMER, the entire disclosure of which is hereby incorporated by reference. The input control devices and/or the load control devices may be manipulated to enter the advanced programming mode in various ways. For instance, the load control device 110 may be moved into the advanced programming mode via a press-and-hold or a double-tap applied to a front area of the load control device 110.

The load control device 110 may be configured to be mounted to a standard electrical wallbox (e.g., via a yoke) and be coupled in series electrical connection between an alternating-current (AC) power source 115 and a lighting load that is wired into the control path of the load control device 110 (e.g., such as the lighting load 102). The load control device 110 may receive an AC mains line voltage $V_{AC}$ from the AC power source 115, and may generate a control signal for controlling the lighting load 102. The control signal may be generated via various phase-control techniques (e.g., a forward phase-control dimming technique or a reverse phase-control dimming technique). The load control device 110 may be configured to receive wireless signals (e.g., from a remote control device) representative of commands to control the lighting load 102, and generate respective control signals for executing the commands. Examples of wall-mounted dimmer switches are described in greater detail in commonly-assigned U.S. Pat. No. 7,242,150, issued Jul. 10, 2007, entitled DIMMER HAVING A POWER SUPPLY MONITORING CIRCUIT; U.S. Pat. No. 7,546,473, issued Jun. 9, 2009, entitled DIMMER HAVING A MICROPROCESSOR CONTROLLED POWER SUPPLY; and U.S. Pat. No. 8,664,881, issued Mar. 4, 2014, entitled TWO-WIRE DIMMER SWITCH FOR LOW-POWER LOADS, the entire disclosures of which are hereby incorporated by reference.

The input control devices described herein may be, for example, a retrofit remote control device 112, a wall-mounted remote control device 114, a tabletop remote control device 116, and/or a handheld remote control device 118, as shown in FIG. 1. The retrofit remote control device 112 may be configured to be mounted to a mechanical switch (e.g., a toggle switch 122) that may be pre-existing in the lighting control system 100. Such a retrofit solution may provide energy savings and/or advanced control features, for example without requiring significant electrical re-wiring and/or without requiring the replacement of existing mechanical switches. As an example, a consumer may replace an existing lamp with the lighting load 104, switch a toggle switch 122 that is coupled to the lighting load 104 to the on position, install (e.g., mount) the retrofit remote control device 112 onto the toggle switch 122, and associate the retrofit remote control device 112 with the lighting source 104. The retrofit remote control device 112 may then be used to perform advanced functions that the toggle switch 122 may be incapable of performing (e.g., such as dimming the intensity level of the light output, changing the color of the light output, providing feedback to a user, etc.). As shown, the toggle switch 122 is coupled (e.g., via a series electrical connection) between the AC power source 115 and an electrical receptacle 120 into which the table lamp 105 in which the lighting load 104 is installed may be plugged (e.g., as shown in FIG. 1). Alternatively, the toggle switch 122 may be coupled between the AC power source 115 and one or more of the lighting loads 102, 104, without the electrical receptacle 120.

The wall-mounted remote control device 114 may be configured to be mounted to a standard electrical wallbox and be electrically connected to the AC power source 115 for receiving power. The wall-mounted remote control device 114 may be configured to receive a user input and may generate and transmit a control signal (e.g., control data such as a digital message) for controlling the lighting loads 102,

104 in response to the user input. The tabletop remote control device 116 may be configured to be placed on a surface (e.g., an end table or nightstand), and may be powered by a direct-current (DC) power source (e.g., a battery or an external DC power supply plugged into an electrical outlet). The tabletop remote control device 116 may be configured to receive a user input, and may generate and transmit a signal (e.g., a digital message) for controlling the lighting loads 102, 104 in response to the user input. The handheld remote control device 118 may be sized to fit into a user's hand, and may be powered by a direct-current (DC) power source (e.g., a battery or an external DC power supply plugged into an electrical outlet). The handheld remote control device 118 may be configured to receive a user input, and may generate and transmit a signal (e.g., a digital message) for controlling the lighting loads 102, 104 in response to the user input. Examples of battery-powered remote controls are described in greater detail in commonly assigned U.S. Pat. No. 8,330,638, issued Dec. 11, 2012, entitled WIRELESS BATTERY POWERED REMOTE CONTROL HAVING MULTIPLE MOUNTING MEANS, and U.S. Pat. No. 7,573,208, issued Aug. 11, 2009, entitled METHOD OF PROGRAMMING A LIGHTING PRESET FROM A RADIO-FREQUENCY REMOTE CONTROL, the entire disclosures of which are hereby incorporated by reference.

It should be appreciated that, although a lighting control system with two lighting loads is provided as an example above, a load control system as described herein may include more or fewer lighting loads, other types of lighting loads, and/or other types of electrical loads that may be configured to be controlled by the one or more control devices. For example, the load control system may include one or more of: a dimming ballast for driving a gas-discharge lamp; an LED driver for driving an LED light source; a dimming circuit for controlling the intensity level of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a set-point temperature of a heating, ventilation, and air-conditioning (HVAC) system; an air conditioner; a compressor; an electric baseboard heater controller; a controllable damper; a variable air volume controller; a fresh air intake controller; a ventilation controller; one or more hydraulic valves for use in radiators and radiant heating system; a humidity control unit; a humidifier; a dehumidifier; a water heater; a boiler controller; a pool pump; a refrigerator; a freezer; a television and/or computer monitor; a video camera; an audio system or amplifier; an elevator; a power supply; a generator; an electric charger, such as an electric vehicle charger; an alternative energy controller; and/or the like.

Figure 2:
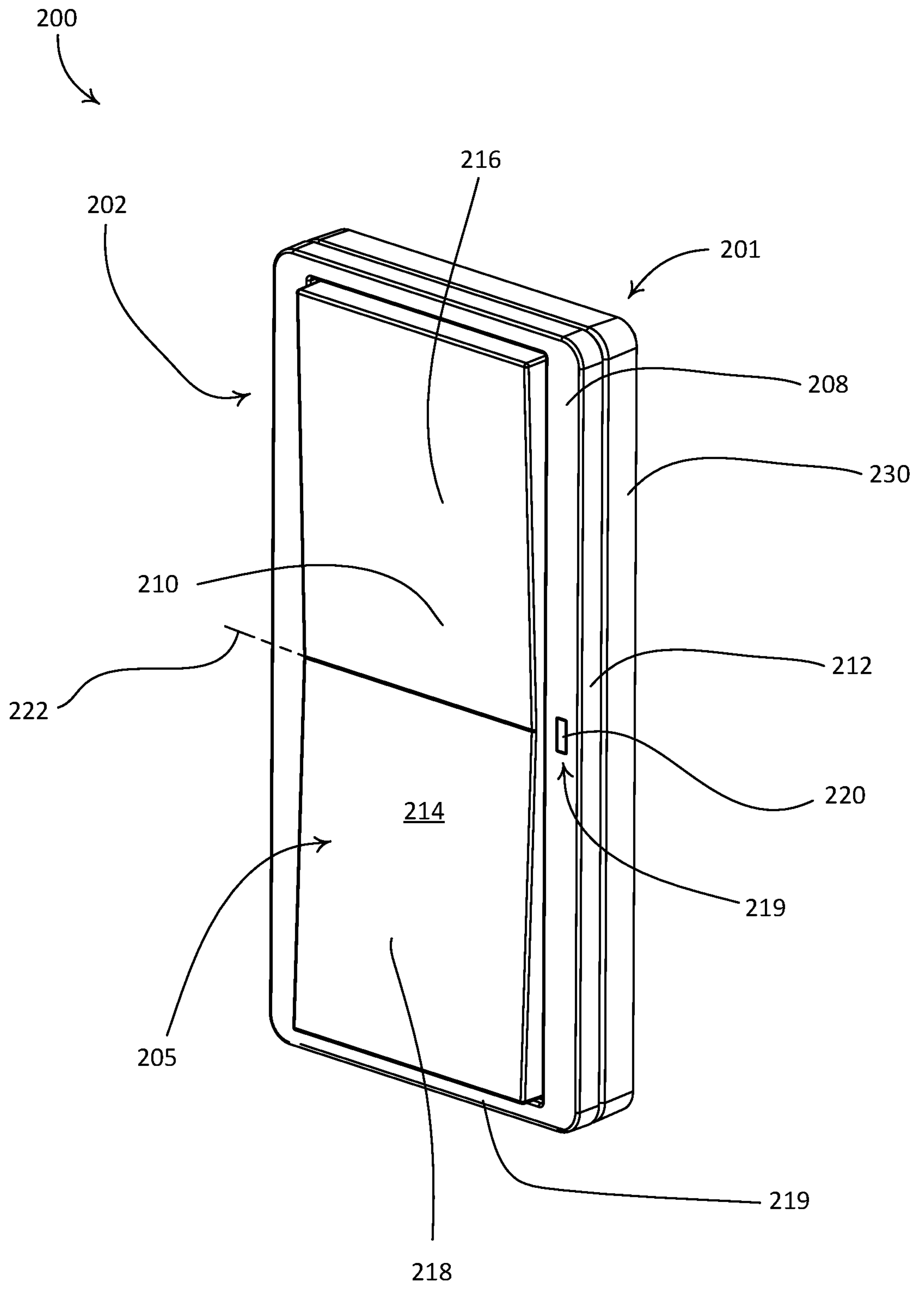
FIG. 2 is a perspective view of an example control device that may be deployed as a control device of the load control system illustrated in FIG. 1.
Figure 3:
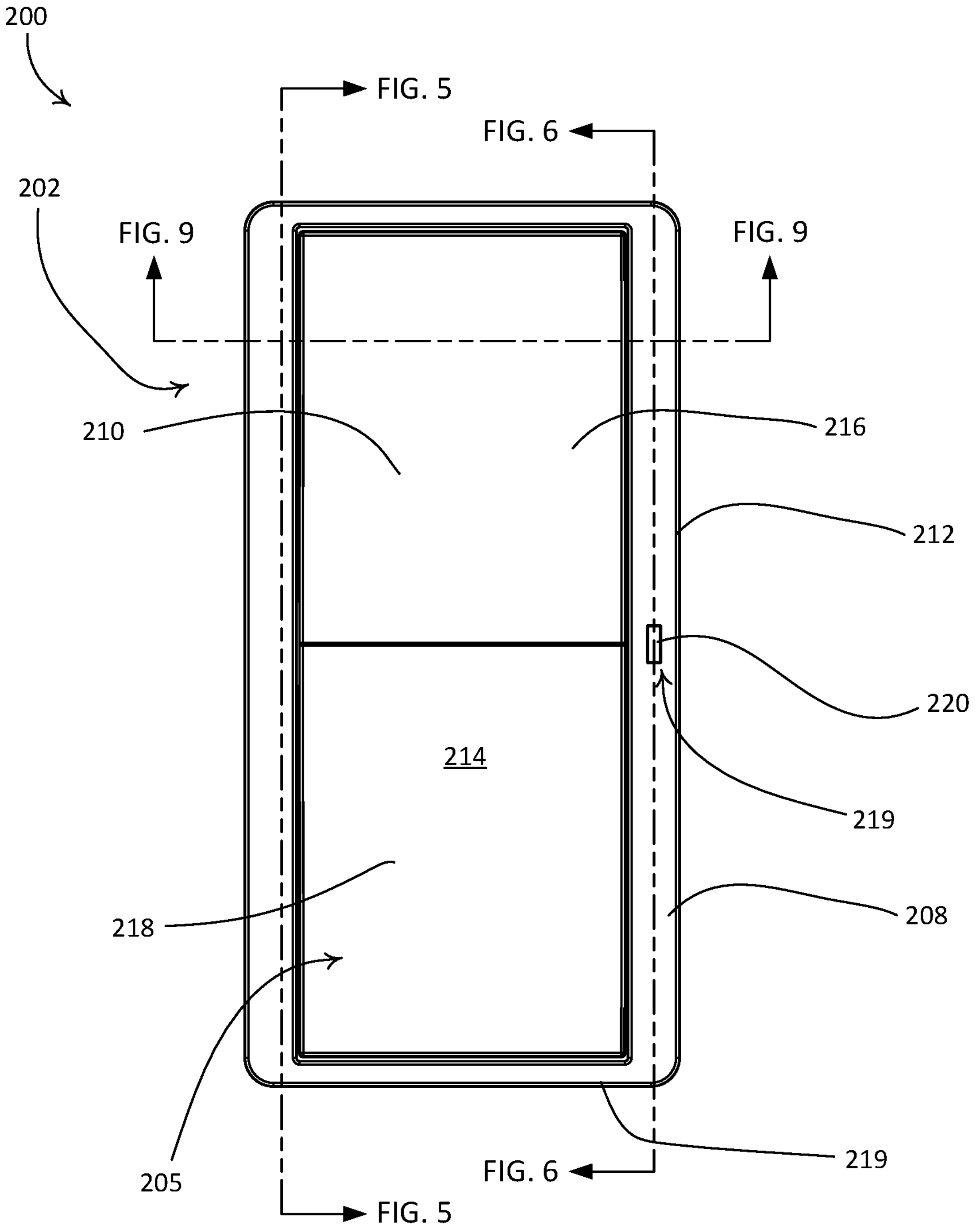
FIG. 3 is a front view of the control device of FIG. 2.
Figure 4:
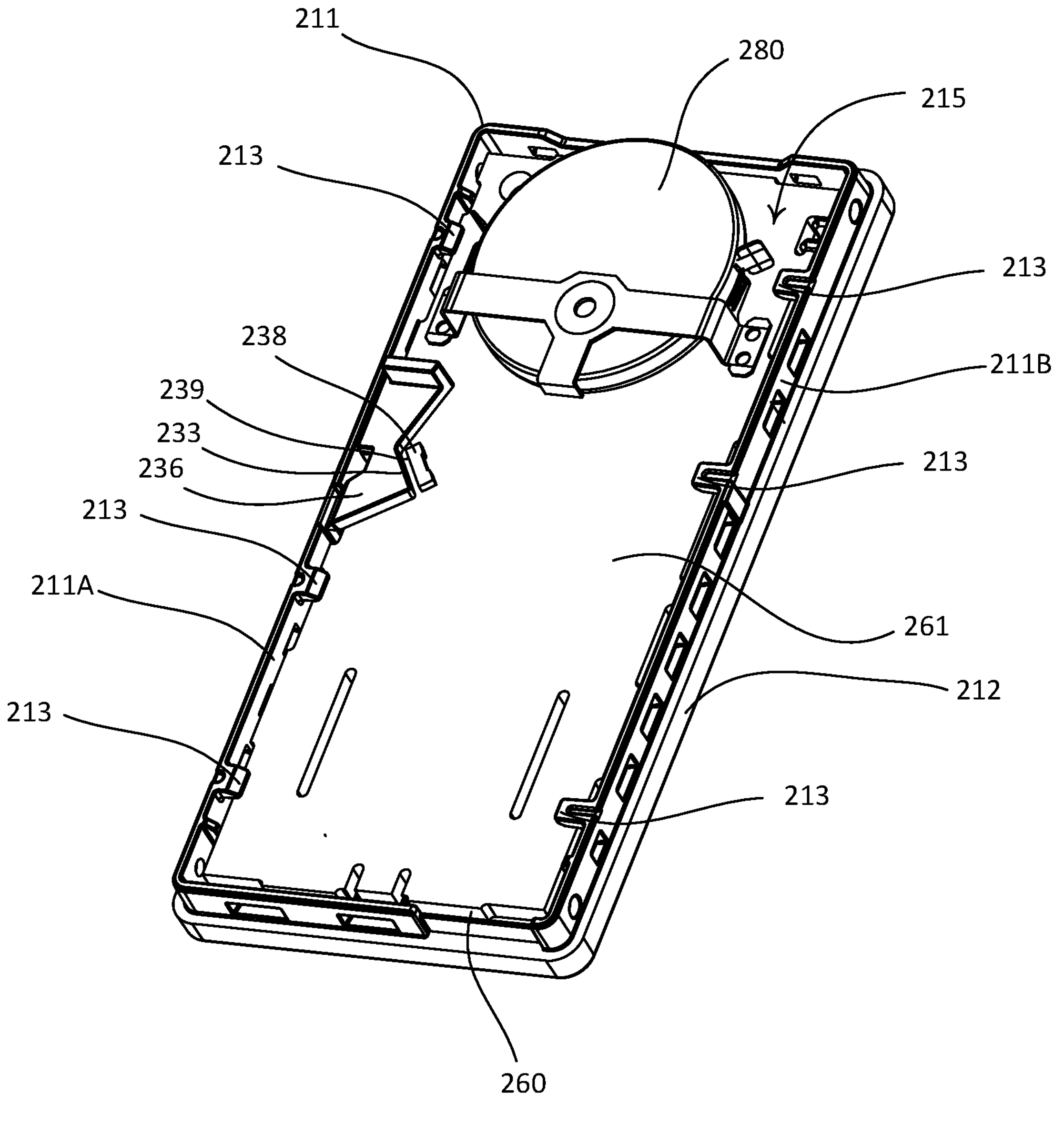
FIG. 4 is a rear perspective view of the control device of FIG. 2 with a rear enclosure removed.
Figure 5:
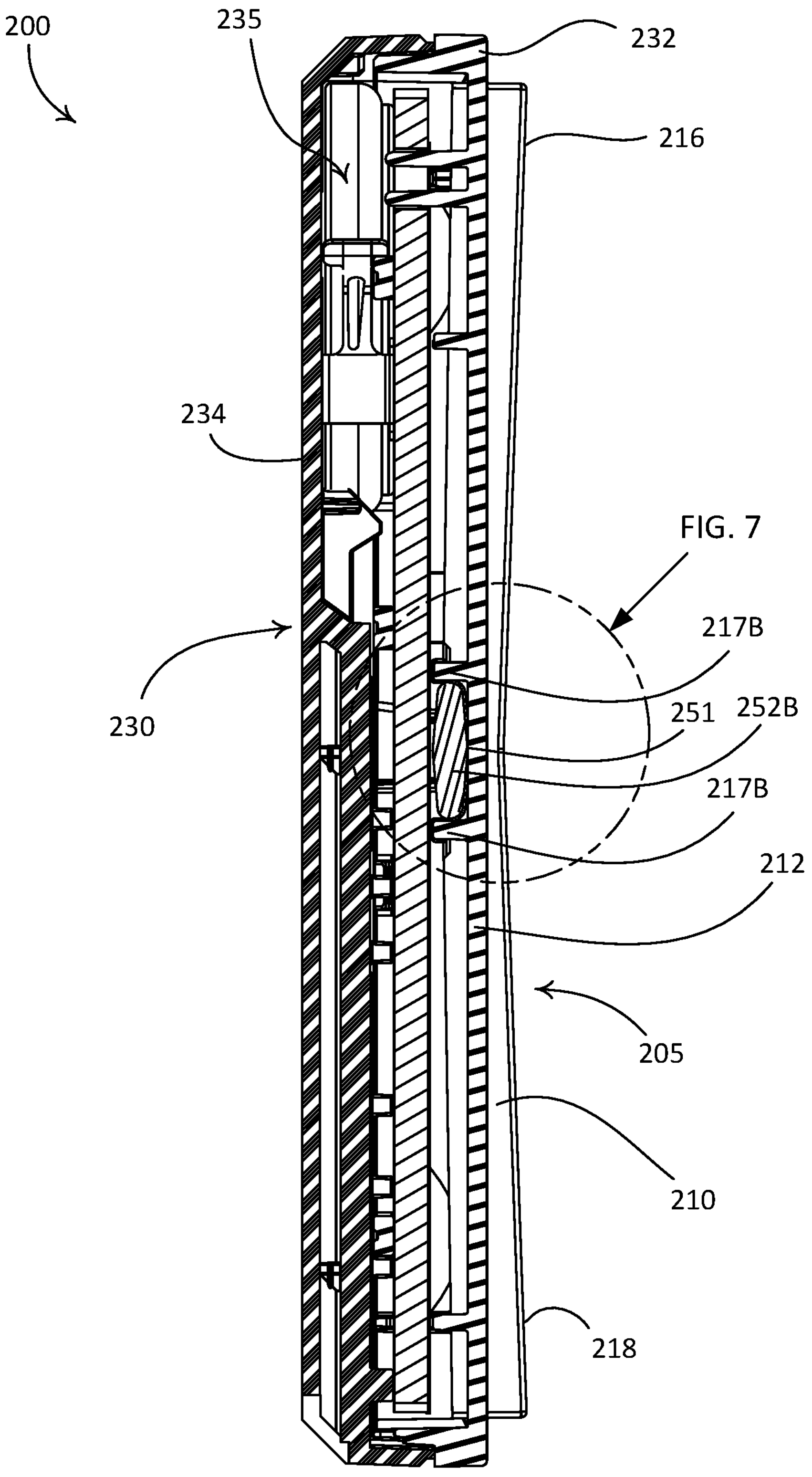
FIG. 5 is a side cross-sectional view of the control device of FIG. 2 (e.g., through the line shown in FIG. 3).
Figure 6:
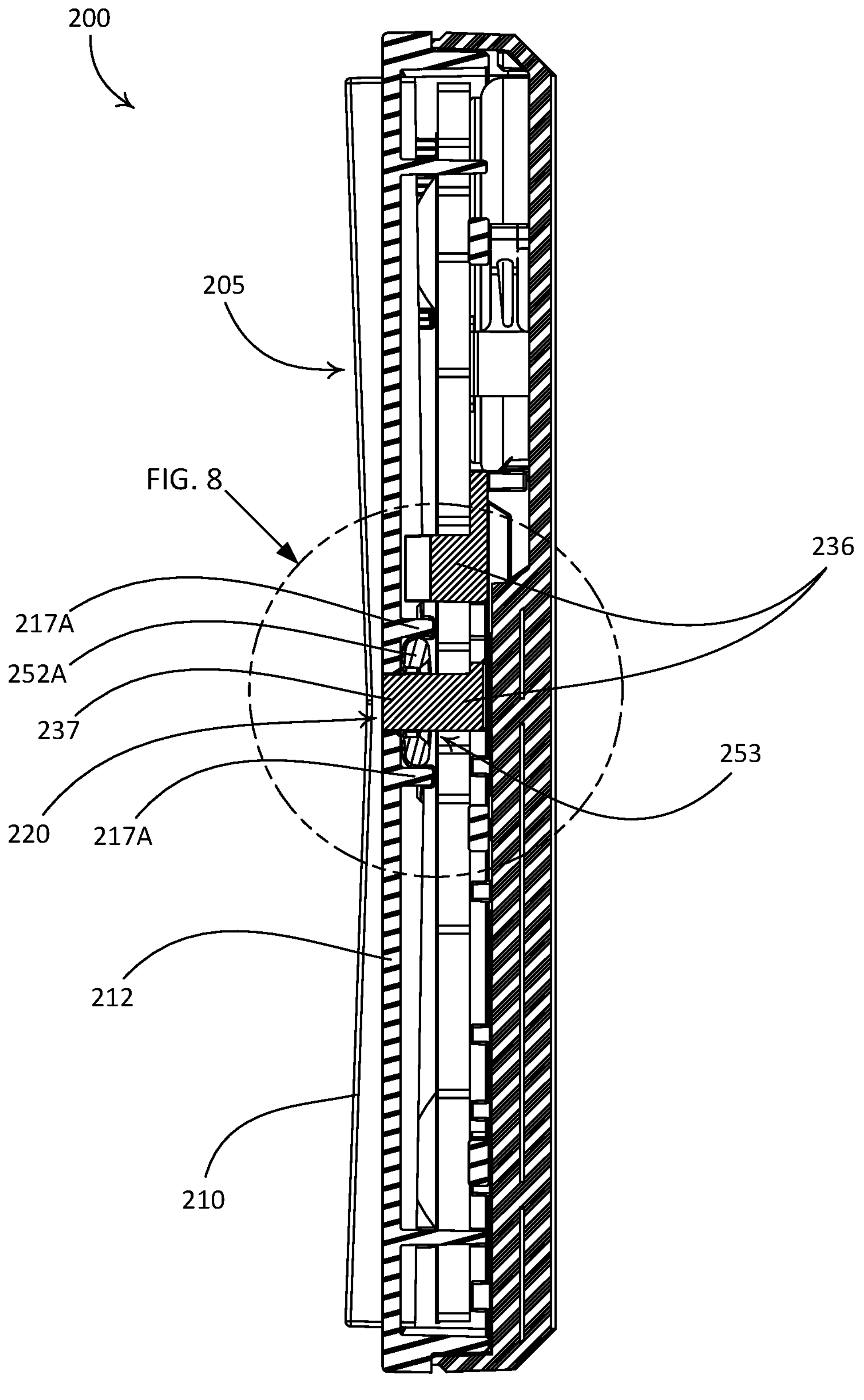
FIG. 6 is another side cross-sectional view of the control device of FIG. 2 (e.g., through the line shown in FIG. 3).
Figure 7:
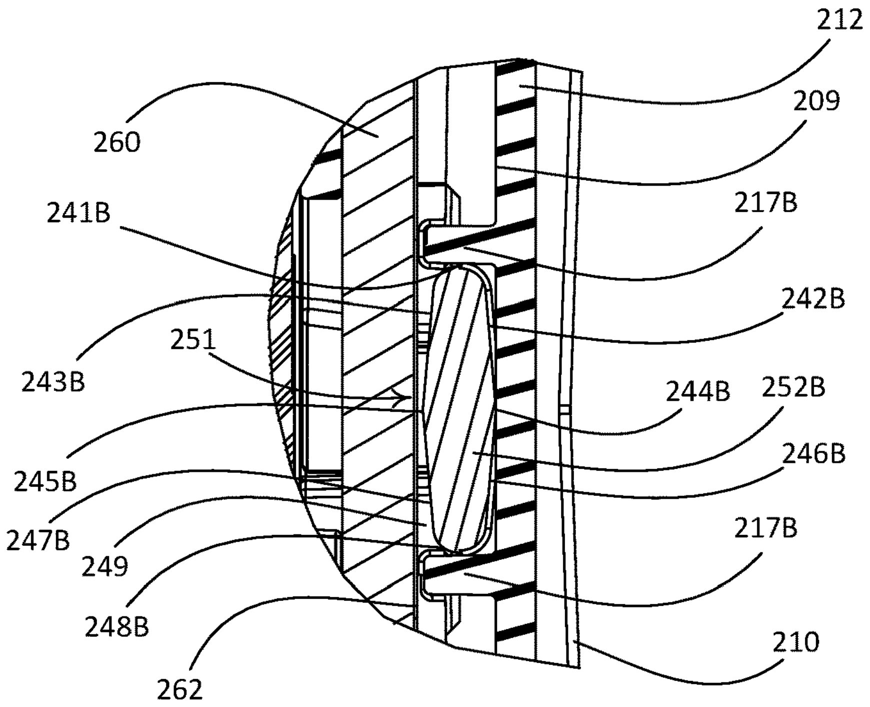
FIG. 7 is a partial detailed view of a side cross-section of the control device of FIG. 2.
Figure 8:
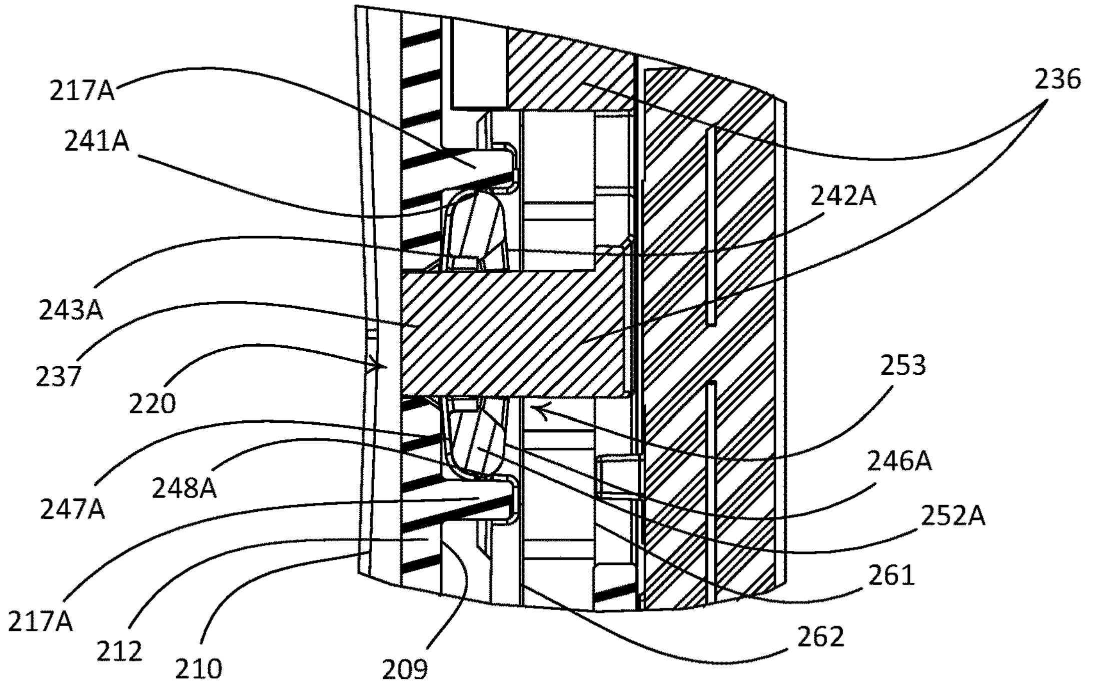
FIG. 8 is a partial detailed view of a side cross section of the control device of FIG. 2.
Figure 9A:
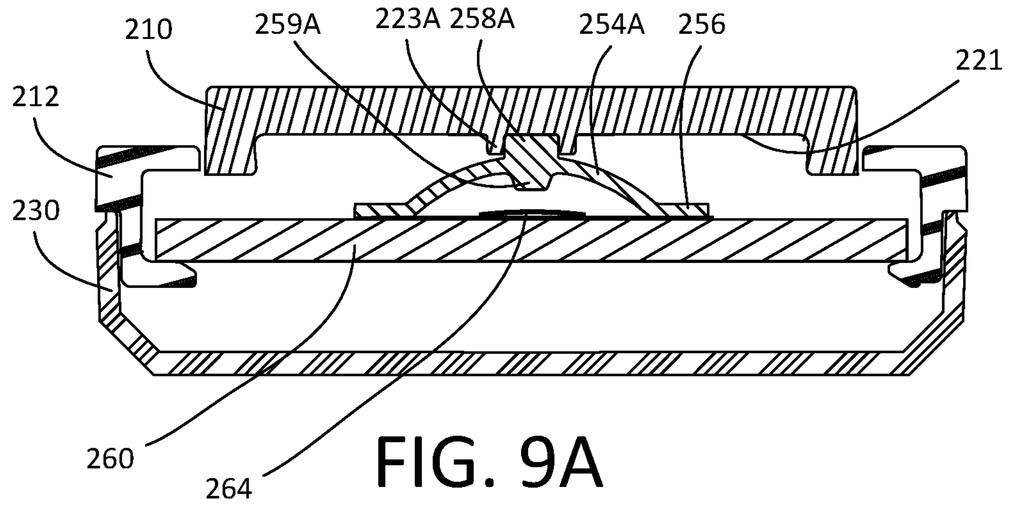
FIGS. 9A-9C are cross-sectional views of the control device of FIG. 2 (e.g., through the line shown in FIG. 3) with an actuation member in different actuation states.
Figure 9B:
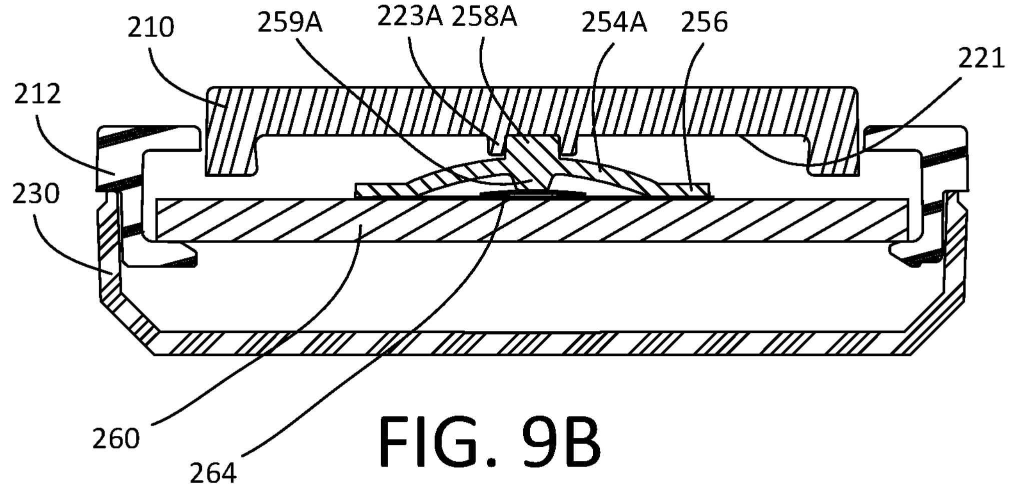
Figure 9C:
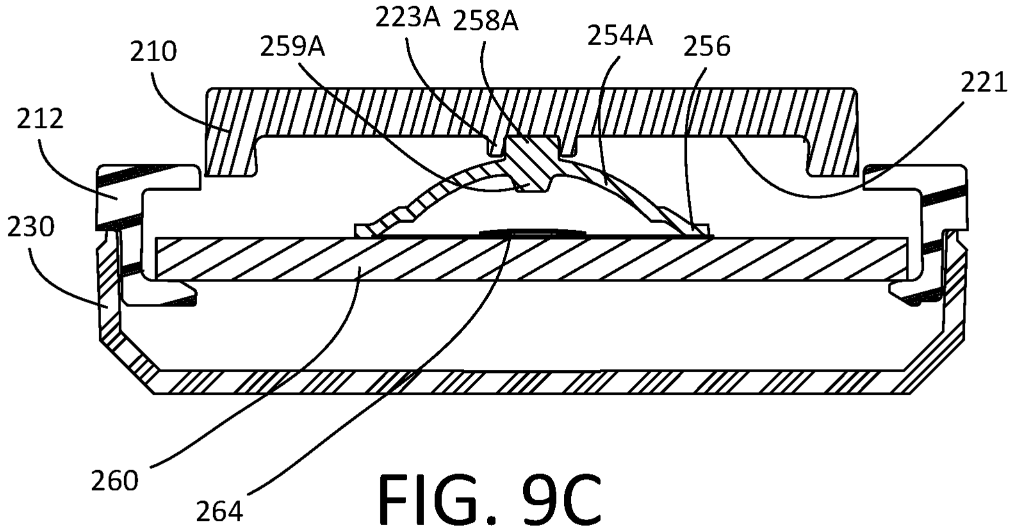
Figure 10:
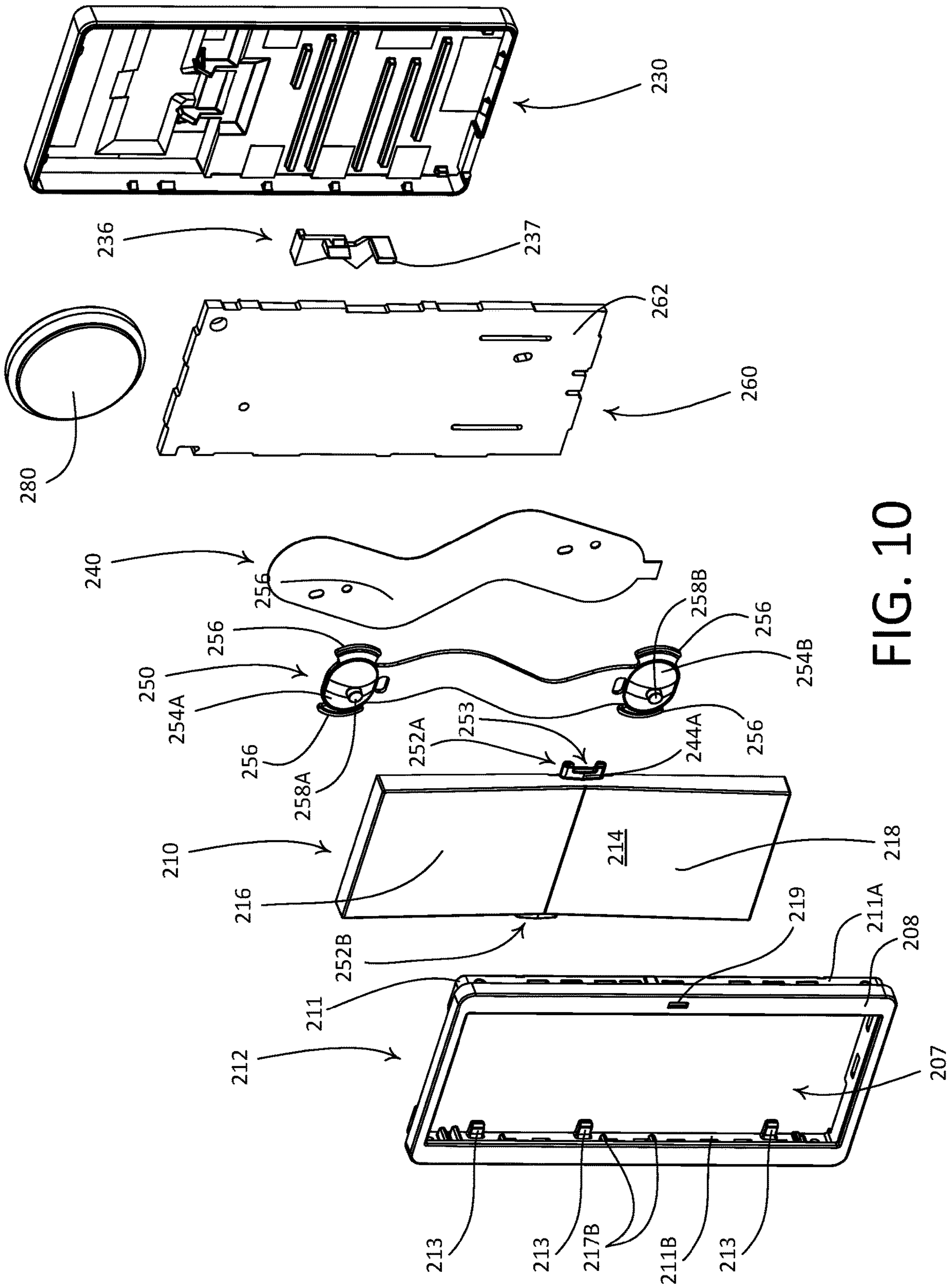
FIG. 10 is a front perspective exploded view of the control device of FIG. 2.
Figure 11:
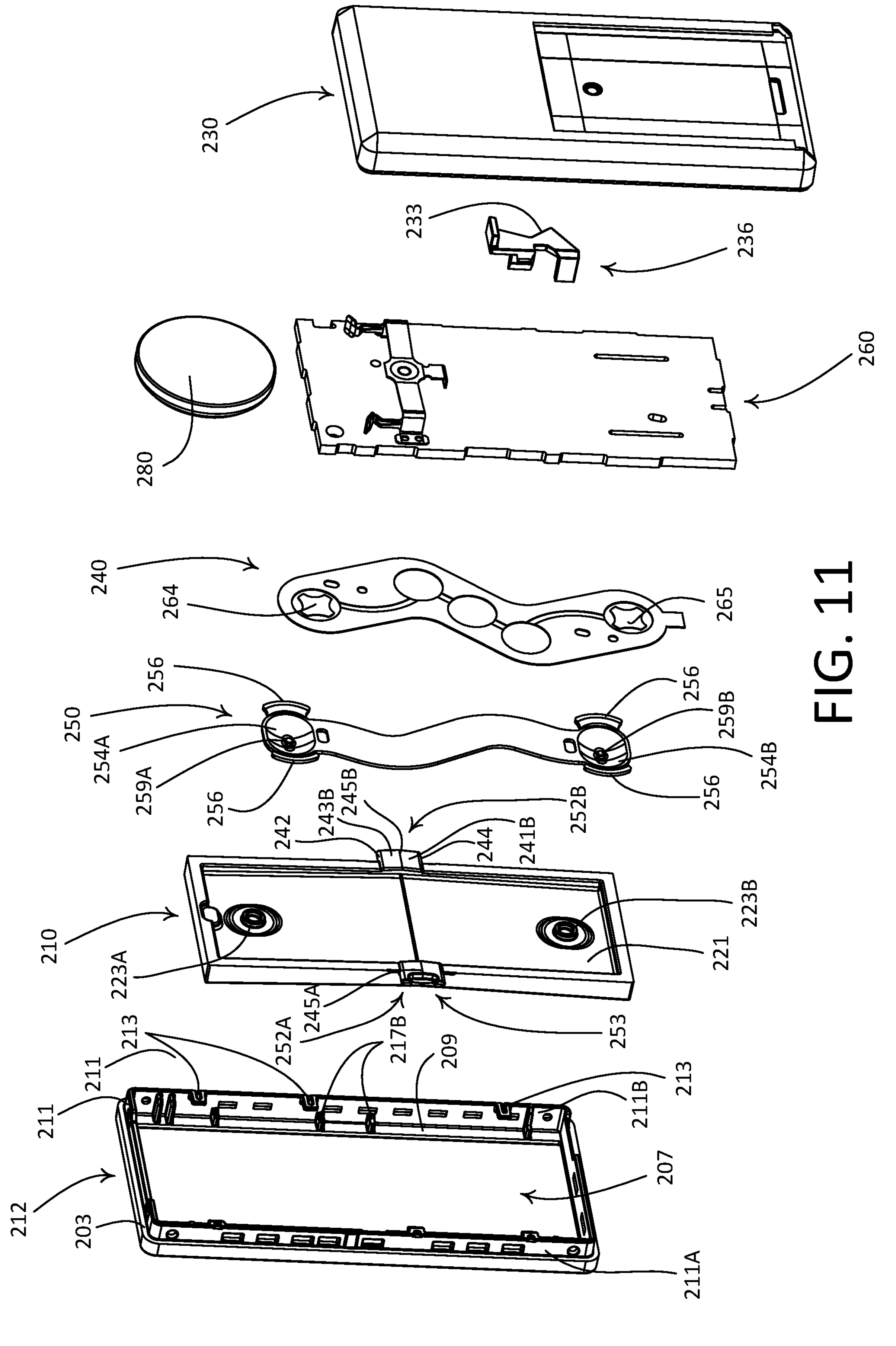
FIG. 11 is a rear perspective exploded view of the control device of FIG. 2.

FIGS. 2-11 depict an example control device 200, such as a remote control device that may be deployed as the retrofit remote control device 112, the wall-mounted remote control 114, the tabletop remote control 116, and/or the handheld remote control 118 in the lighting control system 100. FIG. 2 is a perspective view and FIG. 3 is a front view of the example control device 200. FIG. 4 is a rear perspective view of the control device 200 with a rear enclosure 230 removed. FIGS. 5 and 6 are side cross-sectional views of the control device 200 (e.g., taken through the lines shown in FIG. 3). FIGS. 7 and 8 are partial detailed views of side cross-section views of the control device 200 as shown in FIGS. 5 and 6, respectively. FIGS. 9A-9C are bottom cross-sectional views of the control device 200 with an actuation member 210 in different actuation states (e.g., taken through the lines shown in FIG. 3). FIGS. 10 and 11 are exploded views of the control device 200.

The control device 200 may comprise a user interface 202 and an enclosure 201. The enclosure may comprise a bezel 212 and a rear enclosure 230. The bezel 212 may be a front portion of the enclosure 201 and the rear enclosure 230 may be a rear portion of the enclosure 201. The control device 200 may be configured to control one or more electrical loads. For example, the control device 200 may be configured to control the amount of power delivered to a lighting load (e.g., turn the lighting load on or off, or adjust the intensity level of the lighting load by transmitting a message including control instructions (e.g., a command) for controlling the lighting load via a communication circuit (e.g., via one or more wireless signals via a wireless communication circuit). The bezel 212 may function as a front enclosure (e.g., the front portion of the enclosure 201) for the control device 200. For example, the bezel 212 may at least partially surround the actuation member 210. The bezel 212 may define a front surface 208 that is configured to extend around the actuation member 210. The bezel 212 may define a rear surface 203. The front surface 208 may be substantially parallel to the structure to which the control device 200 is mounted. The rear enclosure 230 may be configured to mechanically attach to the bezel 212 and enclose one or more components of the control device 200. For example, the rear enclosure 230 may enclose a portion (e.g., one or more components) of the control device 200. The rear enclosure 230 may be configured to secure the control device 200 to a wall or some other structure. When the control device 200 is mounted to a wall (e.g., such as with the wall-mounted remote control device 114), the control device 200 may be received in an opening of a faceplate that surrounds the bezel 212. Although not shown in the figures, the faceplate may be configured such that the control device 200 looks like an installed light switch such as the toggle switch 122 shown in FIG. 1.

The user interface 202 of the control device 200 may include an actuation member 210 that may be configured to be mounted relative to the bezel 212 (e.g., a base portion). For example, the bezel 212 may define an opening 207 that is configured to receive (e.g., at least a portion of) the actuation member 210. For example, the bezel may be configured to at least partially surround the actuation member 210. The actuation member 210 may comprise a front surface 214 including a first portion 216 (e.g., an upper portion) and a second portion 218 (e.g., a lower portion). The actuation member 210 may be configured to pivot about a pivot axis 222 (e.g., a central axis) in response to a tactile actuation (e.g., a tactile input) of the first portion 216 and the second portion 218. The control device 200 may be configured to control a lighting load (e.g., such as the lighting loads 102, 104 of the lighting control system 100 shown in FIG. 1) by transmitting a message including control instructions (e.g., a command) to a load control device (e.g., one or more of the load control devices of the lighting control system 100). The control device 200 may be configured to send a first message in response to tactile actuation of the first portion 216 of the actuation member. The control device 200 may be configured to send a second message in response to tactile actuation of the second portion 218 of the actuation member. The control device 200 may be configured to send respective additional messages (e.g., a third message, a fourth message, etc.) in response to advanced tactile actuations of the first portion 216 and/or the second portion 218 of the actuation member 210.

For example, the control device 200 may be configured to transmit a message including control instructions for causing the load control device to turn the lighting load on in response to a tactile actuation of the first portion 216, and to turn the lighting load off in response to a tactile actuation (e.g., a tactile input) of the second portion 218 (or vice versa). For example, the control device 200 may be configured to transmit a message including control instructions for causing the load control device to turn the lighting load on to a previous intensity level (e.g., a lighting intensity of the lighting load before the lighting load was previously turned off), and/or to a preset intensity level (e.g., a predetermined or locked preset intensity level) in response to a tactile actuation of the first portion 216 of the actuation member 210. In addition, the control device 200 may be configured to transmit a message including control instructions for causing the load control device to turn the lighting load on to a high-end intensity level (e.g., a maximum intensity) in response to an advanced tactile actuation of the first portion 216 of the actuation member 210 (e.g., two actuations of the first portion 216 in quick succession as may be referred to as a "double-tap" of the first portion 216). In addition, the control device 200 may be configured to transmit a message including control instructions for causing the load control device to turn the lighting load off by fading from a present intensity level to off in response to an advanced tactile actuation of the second portion 218 of the actuation member 210 (e.g., a press and hold actuation of the second portion 218). It should be appreciated that the control device 200 may also control other electrical loads.

The control device 200 may comprise a light indicator 220. The light indicator 220 may be located proximate to (e.g., on) the bezel 212 of the control device 200. For example, the light indicator 220 may be located in an aperture 219 in the bezel 212 of the control device 200. The light indicator 220 may be configured to be illuminated to provide feedback about various states (e.g., conditions) associated with the control device 200 and/or the lighting load(s) controlled by the control device 200. The light indicator 220 may be located proximate to (e.g., at) the pivot axis 222 of the actuation member 210. For example, the control device 200 may be configured to pivot about the pivot axis 222 and the light indicator 220 may extend through the pivot axis 222. It should be appreciated that the light indicator 220 may be located at other locations on the bezel 212. It should also be appreciated that the control device 200 may comprise a plurality of light indicators (e.g., similar to the light indicator 220) located at various locations on the bezel 212.

The control device 200 may comprise a printed circuit board (PCB) 260 and a switch membrane 240. For example, the PCB 260 may have mounted thereto any combination of a control circuit (e.g., such as the control circuit 310 shown in FIG. 12), a memory (e.g., such as the memory 320 shown in FIG. 12), one or more switches, one or more light sources 238 (e.g., such as the LEDs 318 shown in FIG. 12), a power supply 280 (e.g., such as the battery 322 shown in FIG. 12), etc. The one or more switches may be formed by switch members 264, 265 of the switch membrane 240 and one or more electrical pads/contacts on the PCB 260. The switch members 264, 265 may be shorting elements that short out the open circuits when the actuation member 210 is pressed. The switch membrane 240 may be attached to the PCB 260, for example, using an adhesive. The control circuit mounted to the PCB 260 may be configured to identify when the actuation member 210 pivots in response to a tactile actuation of the first or second portion 216, 218 of the actuation member 210. The switch membrane 240 may be electrically connected to the PCB 260 (e.g., the control circuitry mounted to the PCB 260), for example, during tactile actuations of the first or second portions 216, 218 of the actuation member 210.

The control device 200 may comprise a light pipe 236 that may be configured to conduct light from the one or more light sources 238 to a front side 205 of the control device 200, e.g., to the light indicator 220. For example, the light source(s) 238 may be located inside a cavity defined between the rear enclosure 230 and the PCB 260. The light pipe 236 may be configured to conduct light from a rear surface 261 of the PCB 260 to the front side 205 of the control device 200. For example, the light pipe 236 may extend through several parts of the control device to conduct the light to the front side 205 of the control device 200. At least a portion of the light pipe 236 may define the light indicator 220. For example, the light pipe 236 may define an end portion 237 that is configured as the light indicator 220. The one or more light sources 238 may comprise one or more light-emitting diodes (LEDs) mounted to the PCB 260 (e.g., to a rear surface 261 of the PCB 260). The one or more light sources 238 may be a side-firing LED. For example, the one or more light sources 238 may be configured to emit light through a side surface 239 that is substantially perpendicular to the rear surface 261 of the PCB 260 to which the one or more light source 238 are mounted. The light pipe 236 may be arranged proximate to the side surface 239 of the at least one of the one or more light sources 238 that emits the light. For example, the light pipe 236 may define a side face 233 that is configured to be arranged proximate to and substantially parallel to the side surface 239 of the at least one of the one or more light sources 238. The light pipe 236 may be mechanically attached to the bezel 212. Additionally or alternatively, the light pipe 236 may be attached to the PCB 260. The light pipe 236 may extend through an aperture 219 in the bezel 212. The aperture 219 may extend through the bezel 212. For example, the end portion 237 of the light pipe 236 may extend through the aperture 219 such that the end portion 238 is flush with the front surface 208 of the bezel 212. The light pipe 236 may conduct the light emitted by the light source(s) 238 through the aperture 219 to the light indicator 220.

The PCB 260 may be located between the actuation member 210 and the rear enclosure 230. For example, the PCB 260 may be secured by the bezel 212. The control device 200 (e.g., the bezel 212) may define a collar 211 proximate to a perimeter of the bezel 212. The collar 211 may extend from a rear inner surface 209 of the bezel 212. The collar 211 may define a cavity 215 that is configured to receive the PCB 260. The collar 211 may comprise a plurality of tabs 213 that extend from the collar 211 proximate to the cavity 215. The plurality of tabs 213 may be configured to secure the PCB 260 within the cavity 215. For example, the plurality of tabs 213 may be configured to secure the PCB 260 to the bezel 212.

The control device 200 may include mechanical switches, that may include first and second switch members 264, 265

(e.g., electrical shorting elements). For example, the first and second switch members 264, 265 may be mounted to a rear side of the switch membrane 240. When actuated, the first and second switch member 264, 265 may be configured to render conductive (e.g., short out) respective open circuits (not shown) located on the PCB 260. The first and second switch members 264, 265 may be actuated in response to actuations (e.g., tactile actuations) of the first portion 216 and the second portion 218 of the actuation member 210, respectively (e.g., to control turning the lighting load on and off and/or control the amount of power delivered to the lighting load). In some examples, the control device 200 may be configured to control the lighting load of the lighting control system to turn the lighting load on in response to an actuation of the first switch member 264 and to turn the lighting load off in response to an actuation of the second switch member 265.

The actuation member 210 may include pivot arms 252A, 252B that enable the actuation member 210 to pivot about the pivot axis 222 in response to respective tactile actuation of the first portion 216 and the second portion 218. The pivot arms 252A, 252B may define a diamond-shaped cross section with a rounded upper edge 241A, 241B and a rounded lower edge 248A, 248B. The diamond-shaped cross-section may define angled upper faces 243A, 243B, 242A, 242B and angled lower faces 247A, 247B, 246A, 246B. The angled upper faces 243A, 243B may be on opposed sides of the pivot arms 252A, 252B as the angled upper faces 242A, 242B. The angled lower faces 247A, 247B may be on opposed sides of the pivot arms 252A, 252B as the angled lower faces 246A, 246B. The angled upper faces 243A, 243B and the angled lower faces 247A, 247B may meet at respective pivot edges 245A, 245B. The angled upper faces 242A, 242B and the angled lower faces 246A, 246B may meet at respective pivot edges 244A, 244B.

The diamond-shaped cross section may enable the actuation member 210 to pivot (e.g., rock) in response to tactile actuation of the first portion 216 or the second portion 218 of the actuation member 210. For example, the diamond-shaped cross section may enable the clearance required for the actuation member 210 to pivot. The pivot edges 244A, 244B may be configured to abut the rear inner surface 209 of the bezel 212 and the pivot edges 245A, 245B may be configured to abut a front surface 262 of the PCB 260 in response to tactile actuation of the first portion 216 or the second portion 218 of the actuation member 210. For example, the actuation member 210 may be configured to pivot about the pivot edges 244A, 244B, 245A, 245B of the pivot arms 252A, 252B. The angled upper faces 243A, 243B, 242A, 242B and angled lower faces 247A, 247B, 246A, 246B may be configured to abut the rear inner surface 209 of the bezel 212 or the front surface 262 of the PCB 260 of the control device 200, for example, in response to tactile actuation of the first portion 216 or the second portion 218 of the actuation member 210. For example, the angled upper faces 242B, 243A may abut the rear inner surface 209 of the bezel 212 and the angled upper faces 242A, 243B may abut the front surface 262 of the PCB 260 in response to tactile actuation of the first portion 216 of the actuation member 210. The angled lower surfaces 246B, 247A may abut the rear inner surface 209 of the bezel 212 and the angled lower surfaces 246A, 247B may abut the front surface 262 of the PCB 260 in response to tactile actuation of the second portion 218 of the actuation member 210. The PCB 260 may be configured to secure the actuation member 210 with respect to the bezel 212 and the PCB 260 when the PCB 260 is secured to the bezel 212. It should be appreciated that the pivot arms 252A, 252B are not limited to the diamond-shaped cross section shown in the drawings and the pivot arms 252A, 252B could define another polygon-shaped cross section, with or without rounded edges.

The pivot arms 252A, 252B may define a hinge 251 that connects the actuation member 210 to the bezel 212. For example, the hinge 251 may be a movable joint or mechanism defined by the pivot arms 252A, 252B to enable the actuation member 210 to pivot about the pivot axis 222. the bezel 212 may define a pair of stops 217A, 217B that extend from each side of the collar 211. The stops 217A, 217B may be configured to engage with a respective one of the pivot arms 252A, 252B, for example, to prevent the actuation member 210 from translating up or down with respect to the bezel 212. The pivot arms 252A, 252B may be located within respective cavities 249A, 249B of the control device 200. The cavity 249A may be defined by stops 217A, the rear inner surface 209 of the bezel 212, and the PCB 260. The cavity 249B may be defined by stops 217B, the rear inner surface of the bezel 212, and the PCB 260. The stops 217A, 217B, the bezel, 212, and the PCB 260 may restrict vertical and horizontal movement of the actuation member 210 with respect to the bezel 212, for example, during tactile actuations of the first portion 216 or the second portion 218 of the actuation member 210. A first pair of the stops 217A may extend from a first side 211A of the collar 211 and a second pair of the stops 217B may extend from a second side 211B of the collar 211. The pivot arm 252A is on a first side of the actuation member 210 and the pivot arm 252B is on a second (e.g., opposite) side of the actuation member 210. The first pair of the stops 217A may be configured to engage with the pivot arm 252A and the second pair of the stops 217B may be configured to engage with the pivot arm 252B. The stops 217A, 217B may be configured to allow a respective one of the pivot arms 252A, 252B to rotate as the actuation member 210 pivots. Each pair of stops 217A, 217B may extend into the cavity 215.

One of the pivot arms 252A, 252B (e.g., the pivot arm 252A, as shown in FIGS. 6, 8, 10, and 11) may define a notch 253. The notch 253 may be configured to enable the light pipe 236 (e.g., at least a portion of the light pipe 236) to extend through the pivot arm 252A. For example, the pivot arm 252A (e.g., the notch 253) may be configured to enable the light emitted by the light source(s) 238 to be conducted to the front side 205 of the control device 200 (e.g., to the aperture 220). Although the figures show one of the pivot arms 252A, 252B (e.g., the pivot arm 252A) as defining the notch 253, it should be appreciated that the other pivot arm (e.g., pivot arm 252B) may define a notch (e.g., similar to the notch 253). Additionally or alternatively, both of the pivot arms 252A, 252B may define a respective notch (e.g., both similar to the notch 253). It should be appreciated that the notch 253 may be an opening through the pivot arm 252A (e.g., not located on an edge of the pivot arm 252A).

It should be appreciated that the pivot arm 252A may be translucent to allow the light emitted by the light source(s) to be conducted through the pivot arm 252A and to the front side 205 of the control device 200 (e.g., to the aperture 220). It should also be appreciated that the control device 200 may pivot about near the top or bottom of the actuation member 210 (e.g., the pivot axis 222 may be located near the top or bottom of the actuation member 210) and the control device 200 may have just one actuator (e.g., one tactile switch that may require a press on and a press off).

The tactile actuation of the actuation member 210 may cause one of the first and second switch members 264, 265 of the switch membrane 240 to be actuated. For example, the control device 200 may comprise a return spring membrane 250 (e.g., a rubber membrane) between the actuation member 210 and the first and second switch members 264, 265. The return spring membrane 250 may be configured to deflect inward (e.g., toward the switch membrane 240) to actuate the first switch member 264 or the second switch member 265, respectively. The rear surface 221 of the actuation member 210 may define sockets 223A, 223B. The sockets 223A, 223B may be cylindrical extrusions that extend from the rear surface 221 of the actuation member 210. The sockets 223A, 223B may be configured to hold the return spring membrane 250 in place (e.g., maintain alignment) with respect to the actuation member 210. The sockets 223A, 223B may be configured to captively receive a portion of the return spring membrane 250. For example, the return spring membrane 250 may define nubs 258A, 258B that extend from dome portions 254A, 254B of the return spring membrane 250. Each of the sockets 223A, 223B may be configured to receive a respective one of the nubs 258A, 258B, for example, to removably secure the rubber membrane 250 to the actuation member 210. The nubs 258A, 258B may be configured to remain engaged with the actuation member 210 (e.g., the sockets 223A, 223B) in response to tactile actuations of the first portion 216 and the second portion 218 of the actuation member 210.

The actuation member 210 may be configured to rest in an idle position when not being actuated (e.g., as shown in FIGS. 2 and 9A). For example, the actuation member 210 may be a return-to-idle (e.g., a return-to-center) actuator. The dome portions 254A, 254B may be concave sections of the return spring membrane 250 that are configured to flex and/or deform in response to tactile actuations of the first portion 216 and the second portion 218 of the actuation member 210. The dome portions 254A, 254B may be referred to as return springs, dome springs, rubber springs, etc. The nubs 258A, 258B may remain engaged with the respective sockets 223A, 223B during and after tactile actuations of the first portion 216 and/or the second portion 218 of the actuation member 210. When the first portion 216 of the actuation member 210 is pressed, the dome portion 254A may be compressed toward the first switch member 264 (e.g., toward the switch membrane 240 and the PCB 260 as shown in FIG. 9B) and the dome portion 254B may be pulled away from the second switch member 265 (e.g., away from the switch membrane 240 and the PCB 260). When the second portion 218 of the actuation member 210 is pressed, the dome portion 254B may be compressed toward the second switch member 265 (e.g., toward the switch membrane 240 and the PCB 260) and the dome portion 254A may be pulled away from the first switch member 264 (e.g., away from the switch membrane 240 and the PCB 260 as shown in FIG. 9C). The dome portions 254A, 254B may be configured to return to an idle (e.g., not deformed) state (e.g., as shown in FIG. 9A) when the actuation member 210 returns to the idle position (e.g., after actuation of the first portion 216 or the second portion 218 of the actuation member 210).

If the actuation member 210 is actuated above the dome portion 254A or below the dome portion 254B, the actuation member 210 may pivot about the pivot edges 244A, 244B at sides of the respective pivot arms 252A, 252B adjacent to the bezel 212. If the actuation member 210 is actuated between the dome portions 254A, 254B (e.g., near the pivot axis 212), the actuation member 210 may pivot about the pivot edges 245A, 245B at sides of the respective pivot arms 252A, 252B adjacent to the PCB 260.

The return spring membrane 250 may define wings 256. The wings 256 may extend from the dome portions 254A, 254B. Each of the dome portions 254A, 254B may comprise a pair of wings 256. The wings 256 may be configured to remain engaged with the switch membrane 240 and/or the PCB 260 when the actuation member 210 is in the idle position (e.g., as shown in FIG. 9A), when the first portion 216 of the actuation member 210 is pressed (e.g., as shown in FIG. 9B), and when the second portion 218 of the actuation member 210 is pressed (e.g., as shown in FIG. 9C).

The wings 256 may be in a compressed state (e.g., a partially-compressed state or a fully-compressed state) against the switch membrane 240 and/or the PCB 260 when the actuation member 210 is in the idle position (e.g., as shown in FIG. 9A) and when the corresponding portion of the actuation member 210 is pressed (e.g., as shown in FIG. 9B). The dome portions 254A, 254B may abut the switch membrane 240 and/or the PCB 260 when the actuation member 210 is in the idle position. The dome portions 254A, 254B may be pulled away from the switch membrane 240 and/or the PCB 260 when the other (e.g., non-corresponding) portion of the actuation member 210 is pressed (e.g., as shown in FIG. 9C). At least a portion of the wings 256 may remain in contact with the switch membrane 240 and/or the PCB 260 when the other portion of the actuation member 210 is pressed (e.g., as shown in FIG. 9C). That is, the actuation member 210 may pull a portion of the wings 256 off of the switch membrane 240 and/or the PCB 260 when the other portion of the actuation member 210 is pressed. For example, the wings 256 may be in an uncompressed or extended state when the other portion of the actuation member 210 is pressed. The wings 256 may be configured to such that both of the nubs 258A, 258B remain engaged within the respective sockets 223A, 223B during tactile actuations of the first portion 216 and the second portion 218 of the actuation member 210.

The return spring membrane 250 may define first and second tabs 259A, 259B on the opposed sides of the dome portions 254A, 254B than the nubs 258A, 258B. The first and second tabs 259A, 259B may be configured to abut and actuate the first or second switch member 264, 265, respectively. For example, the first tab 259A may be configured to abut and actuate the first switch member 264 in response to tactile actuations of the first portion 216 of the actuation member 210. The second tab 259B may be configured to abut and actuate the second switch member 265 in response to tactile actuations of the second portion 218 of the actuation member 210.

It should be appreciated that the function of the switch membrane 240 and return spring membrane 250 in the control device 200 may be replaced by tactile switches mounted to a PCB (e.g., such as the PCB 260). In such examples, the PCB may be located behind (e.g., along the rear surface of) the actuation member 210. It should also be appreciated that the control device 200 may include a capacitive touch PCB located proximate to the rear surface 221 of the actuation member 210. The capacitive touch PCB may be configured to detect touch actuations of the front surface 214 of the actuation member 210.

The control device 200 may be configured to transmit and receive wireless messages, e.g., radio-frequency (RF) signals. The control device 200 may include an antenna and a communication circuit (e.g., such as antenna 324 and wireless communication circuit 322 shown in FIG. 12). The wireless communication circuit may comprise an RF transceiver coupled to the antenna for transmitting and/or receiving RF signals. In addition, the wireless communication circuit may comprise an RF transmitter for transmitting RF signals and/or an RF receiver for receiving RF signals.

The control device 200 may be battery-powered. The battery 280 (e.g., the illustrated coin cell battery) may be placed in electrical communication with the circuitry mounted to the PCB 260, for instance to power the control circuit, the wireless communication circuit, and/or other circuitry of the control device 200. The battery 280 may be held in place by a battery contact 282 (e.g., the negative contact). For example, the battery contact 282 may hold the battery 280 in place against the PCB 260 (e.g., a positive contact on the PCB 260). It should be appreciated that the control actuation member 210 and/or the light indicator 220 of the control device 200 could be used on a load control device, such as a dimmer switch.

Figure 12:
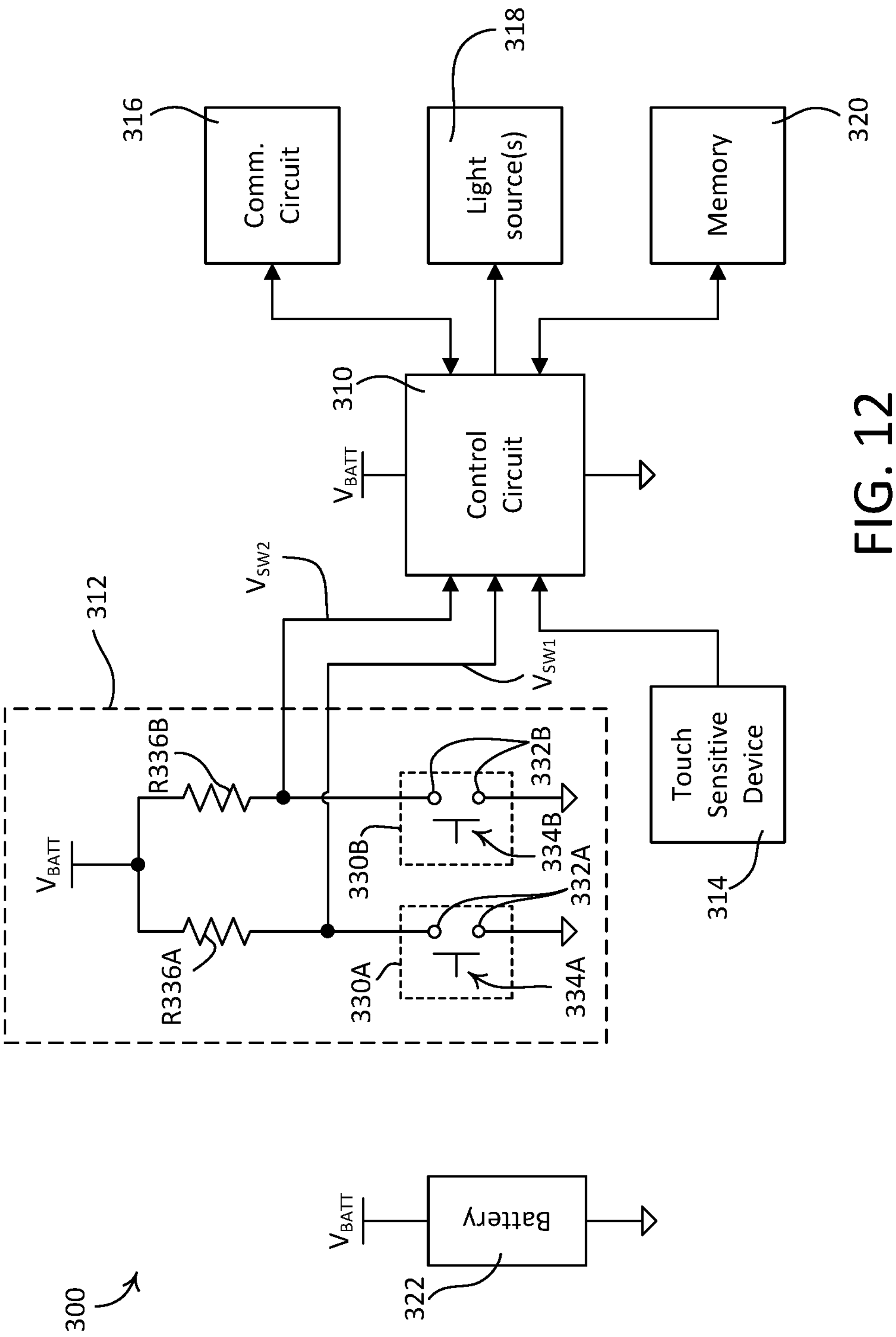
FIG. 12 shows a simplified block diagram of an example control device that may be implemented as the control device illustrated in FIG. 2.

FIG. 12 is a block diagram of an example control device 300 (e.g., a remote control device), which may be deployed as the control device 200 of FIGS. 2-11. The control device 300 may include a control circuit 310, an actuator circuit 312, a touch sensitive device 314, a communication circuit 316, one or more light sources 318 (e.g., such as the light source 238 shown in FIG. 4), a memory 320, and/or a battery 322 (e.g., such as the battery 280 shown in FIGS. 4, 10, and 11). The memory 320 may be configured to store one or more operating parameters (e.g., such as a preconfigured color scene or a preset light intensity) of the control device 300. The memory 320 may be communicatively coupled to the control circuit 310 for the storage and/or retrieval of, for example, operational settings, such as, lighting presets and associated preset light intensities. The memory 320 may be implemented as an external integrated circuit (IC) or as an internal circuit of the control circuit 310. The battery 322 may produce a battery voltage $V_{BATT}$ for providing power to one or more of the electrical components shown in FIG. 12.

The actuator circuit 312 may comprise one or more switches 330*a*, 330*b* (e.g., mechanical tactile switches) that may be actuated in response to actuations of respective actuators (e.g., buttons) of the control device 300 (e.g., the actuation member 210 of the control device 200). The switches 330A, 330B may be configured to generate first and second switch signals $V_{SW1}$, $V_{SW2}$, respectively, in response to actuations of the actuators of the control device 300. The control circuit 310 may receive the first and second switch signals $V_{SW1}$, $V_{SW2}$ to allow the control circuit 310 to detect the actuation of the actuators of the control device 300. Each of the switches 330A, 330B may comprise a respective open circuit including two electrical contacts 332A, 332B (e.g., electrical pads on a printed circuit board, such as the PCB 260). In addition, each of the switches 330A, 330B may comprise a respective shorting element 334A, 334B (e.g., such as the switch members 264, 265). When each of the switches 330A, 330B is actuated (e.g., in response to an actuation of the respective actuator of the control device 300), the respective shorting element 334A, 334B may be configured to electrically connect the respective electrical contacts 333A, 332B (e.g., to short out the open circuit). The open circuit of each of the switches 330A, 330B may be electrically connected in series with a respective resistor R336A, R336B between the battery voltage $V_{BATT}$ and circuit common, such that the first and second switch signals $V_{SW1}$, $V_{SW2}$ are generated at the junctions of the respective switches 330A, 330B and the respective resistors R336A, R336B. It should be appreciated that the control device 300 could have more or less switches 330A, 330B than shown in the figures and/or alternative actuators, such as a potentiometer coupled to a slider in a slot.

The touch sensitive device 314 may include a capacitive or resistive touch element arranged behind, for example, the actuation member 210 of the control device 200. The touch sensitive device 314 may be responsive to actuation of, for example, the touch sensitive surface of the actuation portion 132 and/or the touch sensitive surface the actuation portion 232. The touch sensitive device 314 may be configured to detect point actuations and/or gestures (e.g., the gestures may be effectuated with or without physical contacts with the touch sensitive device 314) and provide respective input signals to the control circuit 310 indicating the detection.

The communication circuit 316 may be configured to communicate (e.g., transmit and/or receive) messages (e.g., digital messages) including control data (e.g., a command) for controlling the lighting load. For example, the communication circuit 316 may comprise a wireless communication circuit (e.g., such as, for example, a radio-frequency (RF) transceiver) for transmitting and/or receiving wireless signals (e.g., RF signals). In some examples, the communication circuit 316 may additionally or alternatively include an RF transmitter for transmitting RF signals, an RF receiver for receiving RF signals, or an infrared (IR) transmitter and/or receiver for transmitting and/or receiving IR signals. The communication circuit 316 may be configured to transmit via the wireless signals a message that includes the control data (e.g., a command) generated by the control circuit 310 for controlling the lighting load. For example, the wireless communication circuit of the communication circuit 316 may be coupled to an antenna for transmitting the messages via the wireless signals for controlling one or more lighting loads. As described herein, the control data may be generated in response to a user input to adjust one or more operational aspects of the lighting load. The control data may include a command and/or identification information (e.g., such as a unique identifier) associated with the control device 300. In addition to or in lieu of transmitting the control signal to the lighting load, the communication circuit 316 may be controlled to transmit the control signal to a central controller of the lighting control system. In some examples, the communication circuit 316 may comprise a wired communication circuit configured to transmit and receive signals via a wired communication link.

The control circuit 310 may be configured to translate the input signals provided by the actuators 312 and/or the touch sensitive device 314 into control data (e.g., one or more commands) for controlling one or more lighting loads. The control circuit 310 may cause the control data (e.g., the one or more commands) to be transmitted via the wireless communication circuit 316 for controlling the lighting loads. In some examples, the communication circuit 316 may transmit a control signal including the control data for controlling the one or more electrical loads to a central controller of the load control system.

The light source(s) 318 may comprise one or more light-emitting diodes (LEDs). The control circuit 310 may control the light source(s) 318 to illuminate a visual indicator (e.g., the light indicator 220 of the control device 200) to provide feedback about various conditions. The control circuit 310 may be configured to illuminate the visual indicator to provide feedback of a status of the lighting load, in response to receiving indications of actuations of switches 330A, 330B of the actuator circuit 316, and/or to indicate a status of the control device 300.

The invention claimed is:

1. A control device configured to control an electrical load, the control device comprising:

a first switch member and a second switch member;

an actuation member comprising an upper portion and a lower portion, the actuation member configured to actuate the first switch member in response to a tactile actuation of the upper portion and configured to actuate the second switch member in response to a tactile actuation of the lower portion, the actuation member comprising first and second pivot arms that enable the actuation member to pivot about a pivot axis in response to tactile actuation of the upper portion and the lower portion, wherein the first pivot arm defines a notch;

a bezel configured to at least partially surround the actuation member;

a light source;

a light pipe configured to conduct light emitted by the light source to a light indicator located on the bezel, wherein at least a portion of the light pipe extends through the notch in the first pivot arm; and a control circuit configured to translate input signals provided by the first and second switch members into control data for controlling the electrical load, wherein the control circuit is configured to generate first control data for turning the electrical load on in response to actuation of the first switch member and generate second control data for turning the electrical load off in response to actuation of the second switch member.

2. The control device of claim 1, further comprising a printed circuit board having the control circuit mounted thereto, the printed circuit board located between the actuation member and a rear enclosure of the control device, wherein the light source is mounted to the printed circuit board.

3. The control device of claim 2, wherein the light pipe is configured to be attached to the printed circuit board.

4. The control device of claim 2, wherein the light source is a side-firing light emitting diode (LED), and wherein the light pipe is arranged proximate to a side surface of the light source that emits the light.

5. The control device of claim 2, further comprising a switch membrane that is electrically connected to the printed circuit board, wherein the first and second switch members are mounted to the switch membrane.

6. The control device of claim 1, wherein a light indicator is configured to be illuminated by the light source to provide feedback about one or more conditions associated with the electrical load.

7. The control device of claim 2, wherein the first and second pivot arms define a hinge that connects the actuation member to the bezel.

8. The control device of claim 7, wherein the first and second pivot arms define a diamond-shaped cross section with a rounded upper edge, a rounded lower edge, and respective angled upper faces and angled lower faces that meet at respective pivot edges.

9. The control device of claim 8, wherein the angled upper faces and angled lower faces are configured to abut a rear inner surface of the bezel or a front surface of a printed circuit board of the control device in response to tactile actuation of the upper portion or the lower portion of the actuation member.

10. The control device of claim 9, wherein a first subset of the angled upper faces abut the rear inner surface of the bezel and a second subset of the angled upper faces abut the front surface of the printed circuit board in response to tactile actuation of the upper portion of the actuation member.

11. The control device of claim 9, wherein a first subset of the angled lower faces abut the front surface of the printed circuit board and a second subset of the angled lower faces abut the rear inner surface of the bezel in response to tactile actuation of the lower portion of the actuation member.

12. The control device of claim 7, wherein the bezel comprises:

a collar that extends around a perimeter of the bezel, the collar extending from a rear inner surface of the bezel; and a pair of stops that extend from each side of the collar.

13. The control device of claim 12, wherein the stops are configured to engage with the first pivot arm or the second pivot arm to prevent the actuation member from translating up or down with respect to the bezel.

14. The control device of claim 12, wherein the stops and the printed circuit board are configured to restrict vertical and horizontal movement of the actuation member during tactile actuations of the upper portion and the lower portion.

15. The control device of claim 1, further comprising a return spring membrane between the actuation member and the first and second switch members.

16. The control device of claim 15, wherein the return spring membrane is configured to deflect inward to actuate the first switch member in response to tactile actuation of the upper portion and actuate the second switch member in response to tactile actuation of the lower portion.

17. The control device of claim 16, wherein the return spring membrane comprises:

a first nub configured to attach the return spring membrane to the upper portion; and a second nub configured to attach the return spring membrane to the lower portion.

18. The control device of claim 17, wherein the actuation member comprises:

a first socket that extends from a rear surface of the upper portion, the first socket configured to captively receive the first nub; and a second socket that extends from the rear surface of the lower portion, the second socket configured to captively receive the second nub.

19. The control device of claim 18, wherein the first and second nubs are configured to remain engaged with the respective first and second sockets in response to tactile actuations of the respective upper and lower portions of the actuation member.

20. The control device of claim 17, wherein the first nub extends from a first dome portion of the return spring membrane and the second nub extends from a second dome portion of the return spring membrane, wherein the first and second dome portions are concave sections of the return spring membrane.

21. The control device of claim 20, wherein the first and second dome portions comprise tabs that are configured to abut and actuate the respective first and second switch members in response to tactile actuation of the upper portion and lower portion of the actuation member.

22. The control device of claim 20, wherein the first and second dome portions are configured to flex in response to tactile actuations of the upper portion and the lower portion of the actuation member.

23. The control device of claim 22, wherein when the upper portion of the actuation member is pressed, the first dome portion is compressed toward the first switch member and the second dome portion is pulled away from the second switch member.

24. The control device of claim 22, wherein when the lower portion of the actuation member is pressed, the second dome portion is compressed toward the second switch member and the first dome portion is pulled away from the first switch member.

25. The control device of claim 22, wherein the first and second dome portions are configured to return to an idle state after tactile actuation of the upper portion or the lower portion.

26. The control device of claim 22, wherein the return spring membrane defines wings that extend from each of the first and second dome portions, the wings configured to remain engaged with a switch membrane or a printed circuit board of the control device during tactile actuations of the upper portion and the lower portion.

27. The control device of claim 26, wherein each of the first and second dome portions define a pair of wings.

28. The control device of claim 27, wherein each of the pair of wings is flat against the switch membrane or the printed circuit board when the actuation member is in an idle position when the corresponding portion of the actuation member is pressed.

29. The control device of claim 27, wherein at least a portion of the pair of wings remains in contact with the switch membrane or the printed circuit board when the other portion of the actuation member is pressed.

30. The control device of claim 1, further comprising a communication circuit that is configured to transmit messages that include commands for controlling the electrical load based on tactile actuations of the actuation member.

31. The control device of claim 1, wherein the light source is located behind the actuation member.

32. A control device configured to control an electrical load, the control device comprising:

a first switch element and a second switch element;

an actuation member comprising an upper portion and a lower portion, the actuation member configured to actuate the first switch element in response to a tactile actuation of the upper portion and configured to actuate the second switch element in response to a tactile actuation of the lower portion, the actuation member comprising first and second pivot arms that enable the actuation member to pivot about a pivot axis in response to tactile actuation of the upper portion and the lower portion, wherein the first pivot arm defines a notch;

a light source located behind the actuation member;

a light pipe configured to conduct light emitted by the light source to a light indicator located on a bezel of the control device, wherein at least a portion of the light pipe extends through the notch in the first pivot arm;

a return spring membrane between the actuation member and the first and second switch members, the return spring membrane configured to deflect inward to actuate the first switch member in response to tactile actuation of the upper portion and actuate the second switch member in response to tactile actuation of the lower portion, wherein the return spring membrane comprises:

a first dome portion configured to flex in response to tactile actuations of the upper portion and the lower portion;

a second dome portion configured to flex in response to tactile actuations of the upper portion and the lower portion:

a first nub extending from the first dome portion, the first nub configured to attach the return spring membrane to the upper portion;

a second nub extending from the second dome portion, the second nub configured to attach the return spring membrane to the lower portion; and a first pair of wings extending from the first dome portion and a second pair of wings extending from the second dome portion, the first and second pair of wings configured to remain engaged with a switch membrane or a printed circuit board of the control device during tactile actuations of the upper portion and the lower portion; and a control circuit configured to translate input signals provided by the first and second switch members into control data for controlling the electrical load.

33. The control device of claim 32, wherein the first dome portion is configured to deflect inward toward the first switch member in response to tactile actuation of the upper portion and the second dome portion is configured to deflect inward toward the second switch member in response to tactile actuation of the lower portion.

34. The control device of claim 32, wherein the actuation member comprises:

a first socket that extends from a rear surface of the upper portion, the first socket configured to captively receive the first nub; and a second socket that extends from the rear surface of the lower portion, the second socket configured to captively receive the second nub.

35. The control device of claim 34, wherein the first and second nubs are configured to remain engaged with the respective first and second sockets in response to tactile actuations of the upper portion and the lower portion of the actuation member.

36. The control device of claim 32, wherein the first and second dome portions are concave sections of the return spring membrane.

37. The control device of claim 36, wherein the first and second dome portions comprise tabs that are configured to abut and actuate the respective first and second switch members in response to tactile actuation of the upper portion and lower portion of the actuation member.

38. The control device of claim 32, wherein when the upper portion of the actuation member is pressed, the first dome portion is compressed toward the first switch member and the second dome portion is pulled away from the second switch member.

39. The control device of claim 32, wherein when the lower portion of the actuation member is pressed, the second dome portion is compressed toward the second switch member and the first dome portion is pulled away from the first switch member.

40. The control device of claim 32, wherein the first and second dome portions are configured to return to an idle state after tactile actuation of the upper portion or the lower portion.

41. The control device of claim 32, wherein the first and second pair of wings are configured to rest flat against the switch membrane or the printed circuit board when the actuation member is in an idle position and when the corresponding portion of the actuation member is pressed.

42. The control device of claim 32, wherein at least a portion of the first and second pair of wings remains in contact with the switch membrane or the printed circuit board when the other portion of the actuation member is pressed.

43. The control device of claim 32, further comprising a printed circuit board having the control circuit and the wireless communication circuit mounted thereto, the printed circuit board located between the actuation member and a rear enclosure of the control device.

44. The control device of claim 43, wherein the light pipe is configured to be attached to the printed circuit board.

45. The control device of claim 43, wherein the light source is a side-firing light emitting diode (LED), and wherein the light pipe is arranged proximate to a side surface of the light source that emits the light.

46. The control device of claim 43, further comprising a switch membrane that is electrically connected to the printed circuit board, wherein the first and second switch members are mounted to the switch membrane.

47. The control device of claim 46, wherein the control circuit is configured to turn the electrical load on in response to actuation of the first switch member and turn the load off in response to actuation of the second switch member.

48. The control device of claim 32, wherein a light indicator is configured to be illuminated by the light source to provide feedback about one or more conditions associated with the electrical load.

49. The control device of claim 32, further comprising a bezel configured to at least partially surround the actuation member.

50. The control device of claim 49, wherein the first and second pivot arms define a hinge that connects the actuation member to the bezel.

51. The control device of claim 50, wherein the first and second pivot arms define a diamond-shaped cross section with a rounded upper edge, a rounded lower edge, and respective angled upper faces and angled lower faces that meet at respective pivot edges.

52. The control device of claim 51, wherein the angled upper faces and angled lower faces are configured to abut a rear inner surface of the bezel or a front surface of a printed circuit board of the control device in response to tactile actuation of the upper portion or the lower portion of the actuation member.

53. The control device of claim 50, wherein the bezel comprises:

a collar that extends around a perimeter of the bezel, the collar extending from a rear inner surface of the bezel; and a pair of stops that extend from each side of the collar.

54. The control device of claim 53, wherein the stops are configured to engage with the first pivot arm or the second pivot arm to prevent the actuation member from translating up or down with respect to the bezel.

55. The control device of claim 53, wherein the stops and a printed circuit board are configured to restrict vertical and horizontal movement of the actuation member during tactile actuations of the upper portion and the lower portion.

56. The control device of claim 32, further comprising a communication circuit that is configured to transmit messages that include commands for controlling the electrical load based on tactile actuations of the actuation member.

57. A control device configured to control an electrical load, the control device comprising:

a first switch member and a second switch member;

an actuation member comprising an upper portion and a lower portion, the actuation member configured to actuate the first switch member in response to a tactile actuation of the upper portion and configured to actuate the second switch member in response to a tactile actuation of the lower portion, the actuation member comprising first and second pivot arms that enable the actuation member to pivot about a pivot axis in response to tactile actuation of the upper portion and the lower portion, wherein the first pivot arm defines a notch;

a bezel configured to at least partially surround the actuation member;

a light source;

a light pipe configured to conduct light emitted by the light source to a light indicator located proximate to the bezel, wherein at least a portion of the light pipe extends through the notch; and a control circuit configured to translate input signals provided by the first and second switch members into control data for controlling the electrical load.

58. A control device configured to control an electrical load, the control device comprising:

a first switch member and a second switch member;

an actuation member comprising an upper portion and a lower portion, the actuation member configured to actuate the first switch member in response to a tactile actuation of the upper portion and configured to actuate the second switch member in response to a tactile actuation of the lower portion, the actuation member comprising first and second pivot arms that enable the actuation member to pivot about a pivot axis in response to tactile actuation of the upper portion and the lower portion, wherein the first pivot arm defines a notch;

an enclosure configured to at least partially surround the actuation member, the enclosure comprising an opening proximate the actuation member;

a light source located within the enclosure;

a light pipe configured to conduct light emitted by the light source through the opening, wherein at least a portion of the light pipe extends through the notch in the first pivot arm; and a control circuit configured to translate input signals provided by the first and second switch members into control data for controlling the electrical load.

59. The control device of claim 58, wherein the enclosure comprises a front portion and a rear portion configured to attach to the front portion.

* * * * *